United States Patent Office 3,329,680
Patented July 4, 1967

3,329,680
PHENYLPIPERAZINOETHYL-INDAZOLES
Albert Hofmann and Franz Troxler, Bottmingen, Switzerland, assignors to Sandoz Ltd. (also known as Sandoz A.G.), Basel, Switzerland
No Drawing. Filed Mar. 23, 1965, Ser. No. 442,189
Claims priority, application Switzerland, Mar. 25, 1964, 3,840/64
2 Claims. (Cl. 260—268)

The present invention relates to new heterocyclic compounds and a process for their production.

The present invention provides heterocyclic compounds of general Formula I,

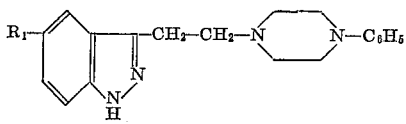

in which $R_1$ signifies a hydrogen atom or a methoxy radical,
and their acid addition salts.

The present invention further provides a process for the production of compounds I and their acid addition salts, characterized in that an indazolyl-(3)-acetic acid derivative of general Formula II,

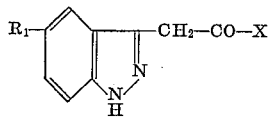

in which $R_1$ has the above significance, and

X signifies a chlorine, bromine or iodine atom, the azide radical or an alkoxy radical of 1–4 carbon atoms inclusive, is reacted with 1-phenyl-piperazine and the resulting indazolyl-(3)-acetic acid piperazide of general Formula III,

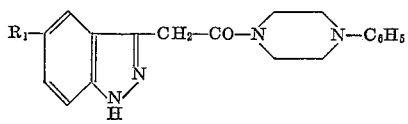

in which $R_1$ has the above significance, is reduced and, when an acid addition salt is desired, salification is effected.

Indazolyl-(3)-acetic acid itself has already been described in the literature, but substitution products thereof have hitherto been unknown. Their production may, for example, be effected as follows:

An o-nitro-benzaldehyde, having the desired substituent, is reacted with malonic acid in the presence of a water removing condensation agent, e.g., piperidine or ammonium acetate. The condensation is preferably effected in an inert organic solvent, e.g., pyridine, toluene and benzene, and at an elevated temperature. The resulting substituted o-nitro-cinnamic acid of Formula IV,

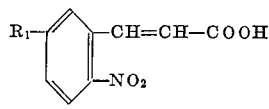

in which $R_1$ has the above significance, is reduced to the corresponding o-amino compound, e.g., with iron-(II)-sulphate in ammoniacal solution. The substituted o-aminocinnamic acid is diazotized in manner known per se and sodium sulphite is added to the diazonium salt solution at 0° C., whereby ring closure to the indazolyl-(3)-acetic acid II (X=OH) occurs.

The process of the invention may for example be effected in that indazolyl-(3)-acetic acid is first converted into its acid chloride or is esterified, e.g., by respectively shaking with phosphorus pentachloride in ether, or by subjecting a suspension or solution of the acid in a mixture of methanol/acetone to the action of diazomethane for a short time and subsequently reacting the resulting acid chloride or methyl ester with 1-phenyl-piperazine. The reaction of the acid chloride is effected at room temperature or whilst cooling slightly and is completed after 5 to 30 minutes; the reaction with the methyl ester, however, requires heating for several hours to a temperature of 100 to 150° C. The reduction of the resulting piperazide III is effected with lithium aluminium hydride at an elevated temperature, preferably in boiling dioxane. The final product may, for example, be purified by recrystallization, either as such or after conversion into a suitable salt, or by chromatography.

Compounds I are solid, crystalline compounds; with inorganic or organic acids they form stable salts. Examples of acids for acid addition salt formations are: hydrochloric, hydrobromic, sulphuric, methanesulphonic, p-toluenesulphonic, maleic, fumaric, malic, tartaric, benzoic and hexahydrobenzoic acid.

Compounds I have valuable pharmacodynamic properties and may be used, for example, in psychiatry, especially as neuroleptics or antipsychotics, due to their neuroleptic action. Thus, experiments on animals have shown that compounds I exhibit a strong potentiation of barbiturate narcosis as well as an inhibition of the spontaneous and artificially increased activity of the test animals (mice); the compounds of the invention furthermore inhibit the conditioned reflexes and emotional reactions and have a certain antagonism towards the central reserpine effects. The compounds have adrenolytic and hypotensive properties. Their toxicity is relatively low in comparison with their effectiveness. They are preferably used in the form of their water-soluble, physiologically acceptable salts.

It should be especially noted that the cataleptic effect which is inherent to known neuroleptics is not observed in the case of 5-methoxy-3-[2-(4-phenylpiperazino)-ethyl]-indazole when administered in doses which already produce neuroleptic effects, e.g., narcosis potentiation; the cataleptic effect is only ascertainable at a dosage level which is considerably higher. This is of great importance in the therapeutical application of the compound, since the cataleptic symptoms in the test animals to some extent correspond to the undesired extrapyramidal disorders in human beings.

Compounds I may be used as pharmaceuticals on their own or in the form of appropriate medicinal preparations, e.g., for oral, enternal or parenteral administration. In order to produce appropriate medicinal preparations the compounds are worked up with inorganic or organic adjuvants which are physiologically inert. Examples of such adjuvants are:

Tablets and dragées: Lactose, starch, talc and stearic acid;
Injectable solutions: Water, alcohols, glycerine and vegetable oils.

The preparations may furthermore contain suitable preserving, stabilizing and wetting agents, solubilizers, sweetening and colouring substances or flavourings.

In the following non-limitative example all temperatures are indicated in degrees centigrade; the melting points were determined in a Tottoli apparatus and are corrected.

EXAMPLE

*5-methoxy-3-[2-(4-phenylpiperazino)-ethyl]-indazole*

An ethereal solution of diazomethane is added to a solution of 8 g. of [5-methoxy-indazolyl-(3)]-acetic acid n a mixture of 50 ml. of methanol and 50 ml. of acetone, after 5 minutes the reaction mixture is evaporated to dryness and the residue is heated to 150° for 3½ hours together with 6.5 g. of 1-phenyl-piperazine. The reaction mixture is then triturated with ethyl acetate and methanol and the [5-methoxy-indazolyl-(3)]-acetic acid 4-phenyl-piperazide which crystallizes out is filtered off. Melting point 201–202°.

A solution of 7.5 g. of [5-methoxy-indazolyl-(3)]-acetic acid 4-phenyl-piperazide and 4 g. of lithium aluminium hydride in 220 ml. of absolute dioxane is heated at reflux for one hour and subsequently the excess reduction agent and complex are decomposed with methanol and concentrated sodium sulphate solution. Filtration is effected, the filtrate is shaken out between a 15% tartaric acid solution and ether, the aqueous phase is separated, made alkaline with dilute sodium hydroxide solution whilst cooling with ice and shaken out several times with ether. The combined ether extracts are dried over sodium sulphate and the ether is evaporated. The resulting crude 5-methoxy-3-[2-(4-phenylpiperazino)-ethyl]-indazole is crystallized from chloroform/petroleum ether; needles having a melting point of 141–143° result.

The hitherto unknown [5-methoxy-indazolyl-(3)]-acetic acid may, for example, be produced as follows:

200 g. of 5-methoxy-2-nitro-benzaldehyde, 232 g. of malonic acid, 9.85 ml. of piperidine and 332 g. of pyridine are heated to 100° for 2 hours and then to the boil for 15 minutes and after cooling the reaction mixture is poured into dilute hydrochloric acid, whereby 2-nitro-5-methoxy-cinnamic acid crystallizes out in the form of needles having a melting point of 225–227°.

A solution of 171 g. of 2-nitro-5-methoxy-cinnamic acid in 1500 ml. of concentrated ammonia solution is added to a solution of 1700 g. of iron-(II)-sulphate in 1380 ml. of water and the mixture is heated to a temperature slightly below the boiling point for half an hour. The solution is filtered whilst hot, the filter residue is washed with 8000 ml. of N sodium hydroxide solution, 450 ml. of glacial acetic acid are added to the filtrate, hydrochloric acid (1:1) is added to adjust the pH value of the solution to 3.6 and the aqueous solution is strongly concentrated, whereby 2-amino-5-methoxy-cinnamic acid crystallizes. Needles having a melting point of 177–179° from ethanol are obtained.

20 g. of sodium nitrite are added to a solution of 58 g. of 2-amino-5-methoxy-cinnamic acid in 150 ml. of water and 600 ml. of N hydrochloric acid at 20°. Cooling is then effected to 0° and 95 g. of sodium sulphite are added, whereby the temperature rises to 5°, stirring is effected for a further 15 minutes whilst cooling, the orange coloured solution is evaporated to a small volume and filtration is effected. The precipitate is dissolved in hot water, acidified with hydrochloric acid and cooled. The [5-methoxy-indazolyl-(3)]-acetic acid which crystallizes is filtered off and recrystallized once from dilute hydrochloric acid. Colourless, glittering leaflets, having a melting point of 170–172°, are obtained.

What is claimed is:

1. A member selected from the group consisting of a compound of the formula:

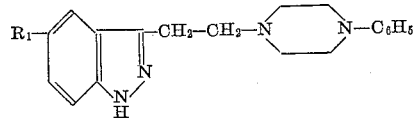

wherein $R_1$ is selected from the group consisting of hydrogen and methoxy and $C_6H_5$ is phenyl and their physiologically acceptable acid addition salts.

2. 5-methoxy-3-[2-(4-phenylpiperazino)-ethyl]-indazole.

References Cited

Ainsworth: J. Amer. Chem. Soc., vol. 80 (1958), pp. 965–67.

Dudykina et al.: Chemical Abstracts, vol. 57 (1962), column 12467.

Hunziker et al.: Chemical Abstracts, vol. 60 (1964), column 2924.

Kochetkov et al.: Chemical Abstracts, vol. 55 (1961), columns 22, 292–93.

ALEX MAZEL, *Primary Examiner.*

HENRY R. JILES, *Examiner.*